June 20, 1939.  G. A. LYON  2,162,734
METHOD OF JOINING PARTS
Filed May 29, 1936  3 Sheets-Sheet 1
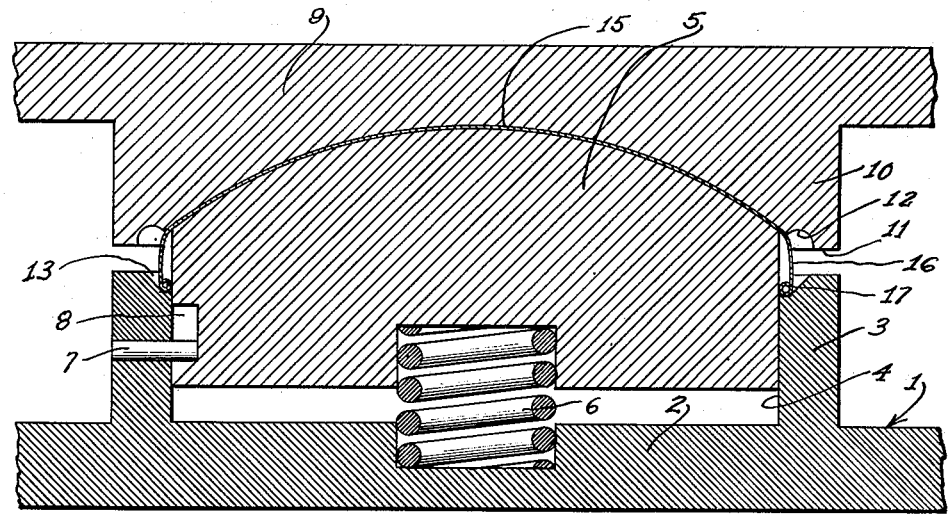
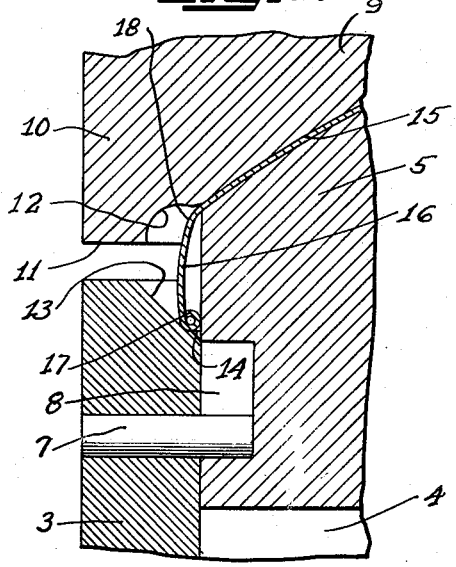 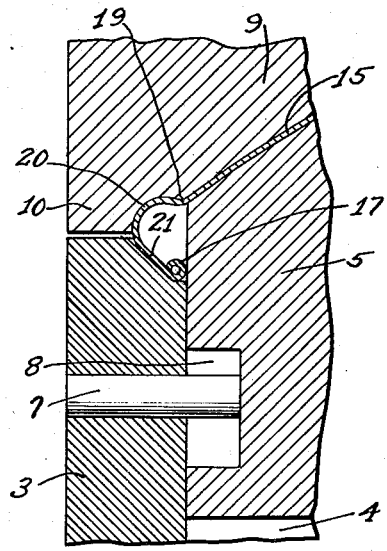
Inventor
GEORGE ALBERT LYON.
by Charles H Hill Attys.

June 20, 1939. G. A. LYON 2,162,734
METHOD OF JOINING PARTS
Filed May 29, 1936 3 Sheets-Sheet 2
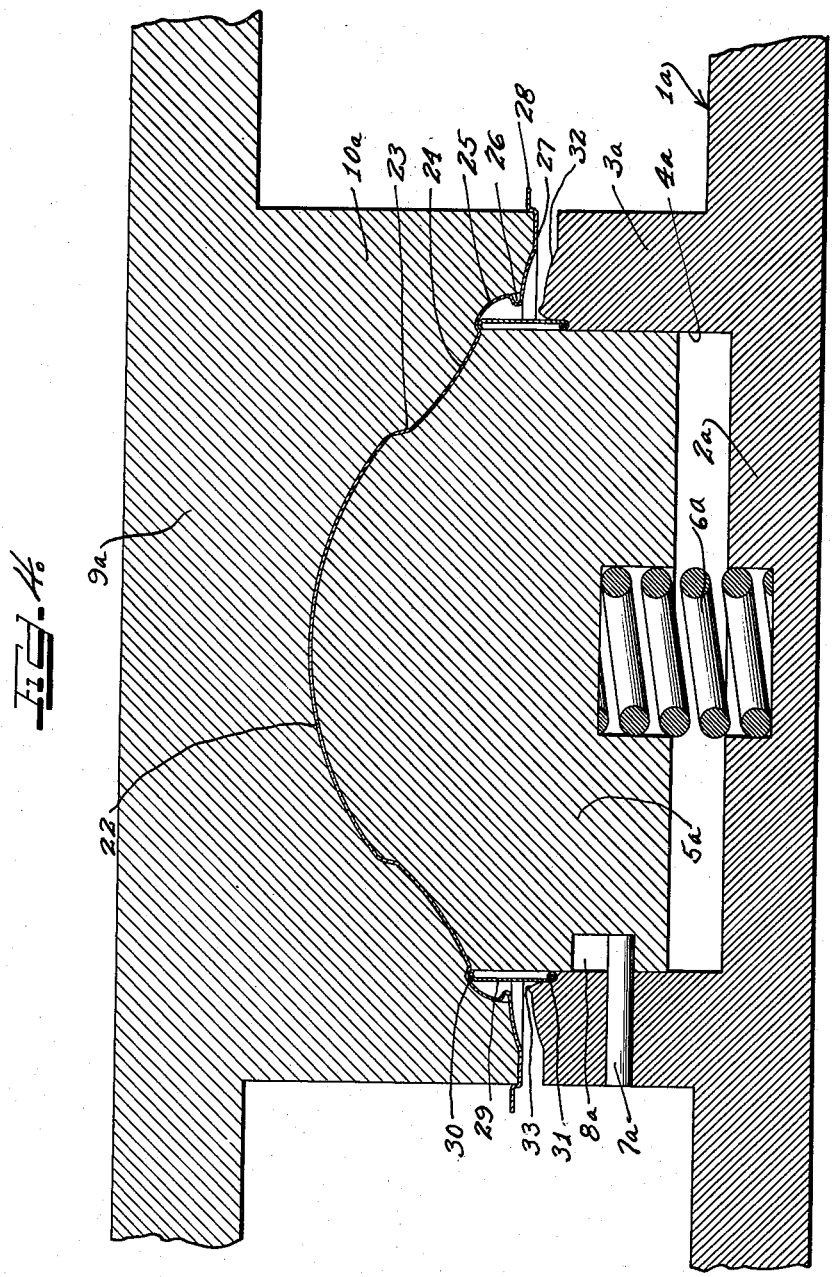
Inventor
GEORGE ALBERT LYON.
by Charles Cowills Attys.

June 20, 1939.  G. A. LYON  2,162,734
METHOD OF JOINING PARTS
Filed May 29, 1936   3 Sheets-Sheet 3
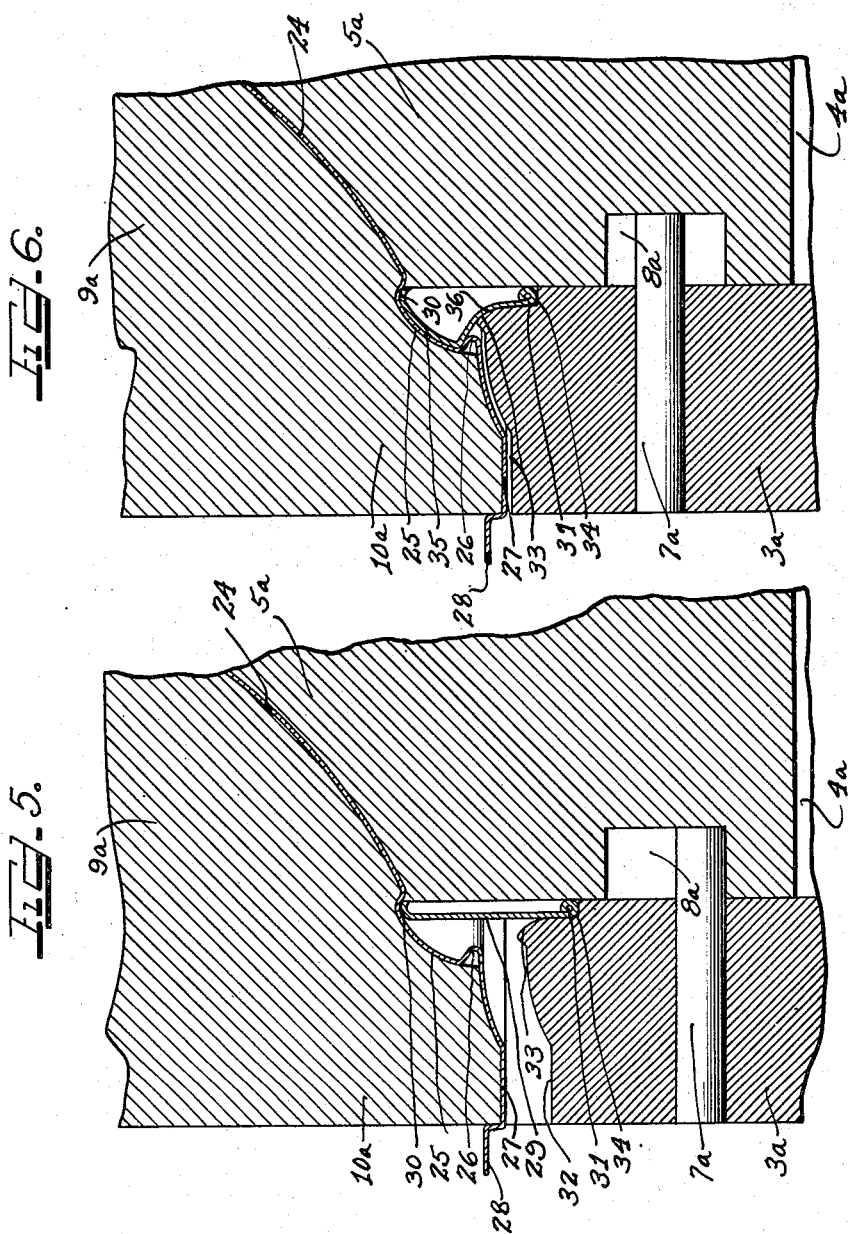
Inventor
GEORGE ALBERT LYON.
by Charles O. Hills Attys.

Patented June 20, 1939

2,162,734

UNITED STATES PATENT OFFICE 2,162,734

METHOD OF JOINING PARTS

George Albert Lyon, Detroit, Mich.

Application May 29, 1936, Serial No. 82,403

5 Claims. (Cl. 113—116)

This invention relates to improvements in a method of die-forming articles, the invention being highly desirable for use in connection with the blanking or forming of a vehicle wheel covering, such as a tire cover part, a wheel disk part, a hub cap part, or the like.

In the making of ornamental vehicle wheel coverings for disposition over the outer side surface of a wheel to enhance the appearance of the wheel and the vehicle as a whole, a hub portion is frequently provided in the cover in the shape of a raised crown embodying an undercut annular indentation or recess having a diameter at its bottom considerably less than the maximum diameter of the circumferential edge portion of the crown part. Usually, heretofore, such grooving was accomplished by spinning a relatively light metal inwardly beneath the head of the crown part. Such a spinning operation is objectionably expensive, and the thickness of stock utilized was sometimes limited by the necessity of employing a spinning operation.

I have provided a method of die-forming such an undercut groove by collapsing the skirt of the crown portion inwardly, by die mechanism, and I have also provided a method of and apparatus for uniting two parts, such, for example, as collapsing the skirt of a crown portion of a wheel covering inwardly over an attaching flange. However, in some instances a satisfactory structure may be formed by forcing the skirt of a crown portion to collapse outwardly in an intermediate region, leaving a portion of the skirt extending inwardly beneath the collapsed part.

An object of this invention is to provide a method of uniting a pair of parts, such as the body portion of a wheel disk structure and a fastening flange by means of which a disk is attached to a vehicle wheel, including the steps of preforming the body portion of the disk and then die-forming the attaching flange and simultaneously locking the flange to the disk with the forming thereof.

It is also an object of the present invention to provide a method of uniting a pair of parts, such as a wheel covering and a flange part by die-forming the flange part so that the same fits around an undercut or inwardly extending portion of the wheel covering.

Also a feature of the invention is the provision of a method of uniting a pair of parts, such as a wheel covering and an attaching flange, the wheel covering having an annular bulge defining an interior annular groove, including the die-forming of the attaching flange to shape the same inside said groove and so unit the parts.

A still further object of the invention is to provide method of attaching a flange to a wheel covering element of tortuous configuration, including the placing of a completely formed crown portion of the element over the attaching flange, which is of less diameter than the interior of the element, and then, with the aid of die mechanism, reshaping the attaching flange to intimately fit the adjacent contour of the element and so unite the parts.

Other objects and features of this invention will more fully appear from the following detailed description taken in connection with the accompanying drawings, in which:

Figure 1 is a fragmentary vertical sectional view, with parts in elevation, illustrating die mechanism for shaping an element in the nature of a hub cap in an initial stage of operation;

Figure 2 is a fragmentary enlargement of the left-hand portion of the structure shown in Figure 1;

Figure 3 is a fragmentary enlargement of the left-hand portion of the structure shown in Figure 1 in a more advanced stage of operation;

Figure 4 is a fragmentary vertical sectional view, with parts in elevation, of a die mechanism of slightly different contour arranged in an initial stage of operation for uniting a pair of parts;

Figure 5 is a fragmentary enlargement of the structure shown in the left-hand portion of Figure 4; and Figure 6 is a fragmentary enlargement of the structure shown in the left-hand portion of Figure 4, showing the same in a more advanced stage of operation.

As shown on the drawings:

The die mechanism shown in the various figures of the drawings hereto appended may be varied through a wide range without departing from the principles of this invention. However, the illustrated structure, which is more or less diagrammatically illustrated, is sufficient for adequately furnishing a specific example of the invention, both as to the apparatus and the method.

With reference to Figures 1 to 3, inclusive, I have illustrated both apparatus and a method of forming a covering for a vehicle wheel in the nature of a hub cap provided with a fastening flange of less diameter than the maximum diameter of the remainder of the hub cap. This fastening flange, of course, engages with resilient retaining elements carried by the vehicle wheel to which the hub cap is to be attached, these elements snapping over and around the inner end of the fastening flange to hold the hub cap in position upon the wheel.

To accommodate the retaining elements, it is necessary that the hub cap have an interior groove adjacent the inner end of the fastening flange, or a groove defined by the fastening flange, and in the present instance, such groove is provided by collapsing the skirt of the hub cap outwardly in an intermediate region. In consistency with the principles of the present invention, the collapsing operation is preferably formed by die-forming mechanism.

The illustrated die-forming mechanism includes a lower die or die block, generally indicated by numeral 1, comprising a base 2, and an upstanding solid die ring 3 defining an interior opening 4 above the base. Inside this opening is a reciprocable die pad 5 normally urged outwardly by one or more springs 6 disposed in confronting recesses in the die pad and base 2. The outward movement of the pad is limited by one or more pins 7 fixed in the wall of the die ring 3 and having an inner end extending into a recess or notch 8 in the pad.

The mechanism also includes an upper die 9 preferably in the form of a solid block. This upper die member has a depending portion 10 of substantially the same over-all size as the die ring 3.

The die members, in this instance, are designed for shaping a crown hub cap, and more specifically for the shaping of the skirt of the hub cap, while the preformed shape of the head thereof is maintained intact. To this end, the depending portion 10 of the upper die is concave in accordance with the dome shape of the article to be formed, and the upper face of the pad 5 of the lower die is convex in complement to the upper die.

Outside the concave formation, the upper die is provided with a substantially flat face 11 disposed opposite the face of the die ring 3, and at the inner part of this flat face 11, an annular recess or groove 12 is formed in the upper die.

The face of the die ring 3 is provided opposite the groove 12 with an annular groove 13 defined by a sloping wall on the die ring and by the vertical side wall of the pad 5. This groove preferably terminates in a relatively narrow flat bottom 14, thereby giving the groove 13 substantially a triangular cross-section with one point of the triangle blunted to form the bottom 14.

The hub cap part to be formed by the die mechanism above described is preformed by any suitable mechanism to the shape seen in Figures 1 and 2, preferably from a single blank of stock, such, for example, as a sheet of stainless steel. As preformed, the hub cap part includes a dome central portion 15 and a skirt 16, the lower margin of which is rolled or turned inwardly as indicated at 17. The preforming of the hub cap part is such as to give the skirt 16 a shape so that when pressure is applied axially to the hub cap part, the skirt will collapse outwardly in an intermediate region. This preforming, in the present instance, includes the aforesaid rolled margin 17 of the skirt, an arcuate connection 18 between the dome top 15 and the skirt, and the skirt itself is given a slightly concavo-convex shape, with the concave face on the inside. This results in the outer portion of the skirt having a curvature including the arcuate portion 18, the outer face of the skirt, and the outer portion of the rolled margin or bead 17. When axial pressure is applied to the hub cap part, therefore, with the dome portion 15 of the hub cap held against distortion, the skirt is inclined to buckle or collapse outwardly.

As seen in Figures 1 and 2, the preformed hub cap part is placed over the die pad 5 which is preferably of such size as to fit inside the rolled margin or bead 17, keeping the skirt itself spaced from the side wall of the pad. The bead 17 seats in the groove 13 of the die ring 3, preferably with the bead resting on the base 14, contacting the outer wall of the pad 5, and also contacting the lower portion of the sloping wall defining the groove. The upper die may be brought down upon the lower by any suitable mechanism such as a punch press, and in the initial stage of contact the dome portion 15 of the hub cap is clamped firmly between the concave face of the upper die and the pad 5, wherein it is effectively held against distortion. As the upper die descends, against the action of the spring or springs 6, the skirt is collapsed outwardly, substantially filling the groove 12 in the upper die and following the substantially straight inclined wall defining the groove 13 in the lower die, as shown clearly in Figure 3. The bead 17 of the skirt remains preferably in contact with the bottom 14 of the groove 13 and also in contact with the outer wall of the pad 5.

When so formed, it will be seen that the hub cap is provided with a dome top 15, a slight reverse curvature 19, an annular bulging portion 20, an inwardly extending flange 21, terminating in the bead 17. The inwardly extending flange portion 21 is, of course, defined by the sloping wall of the groove 13 and the outwardly bulged portion 20 is defined by the groove 12 in the upper die. This annular bulge or ridge 20, of course, may be given any desirable shape depending upon the contour of the groove 12, the upper die determining and confining the metal of the hub cap to form this bulge or ridge. It will be noted that the flange part 21 extends inwardly beneath the outer portion of the hub cap in position for the bead 17 to be engaged by resilient retaining means carried by the wheel, and the bulge or ridge portion 20 aids in defining an interior groove for the reception of the ends of such retaining elements.

In the movement of the die mechanism, the bead 17 acts substantially as a pivot or fulcrum about which the metal of the skirt moves when assuming the shape of the ridge 20 and flange part 21. It will be seen that the arrangement above described prevents a shifting of the turned edge 17 and also a crimping of this edge upon itself.

In Figures 4, 5 and 6, I have illustrated a method of an apparatus for uniting a pair of parts by die mechanism. In some instances, in the formation of a wheel covering member, such as a wheel disk, it is desirable to provide a fastening flange by attaching an initially separate part to the main disk structure. In attaching these parts in accordance with the teachings of this invention, no welding, riveting or other extraneous securing operations are necessary. The attaching flange part, having a predetermined shape, is die-formed so as to intimately fit a portion of the inside surface of the disk part above or inside an undercut portion, and the parts are thus firmly joined together.

In this instance, the disk part includes a central dome portion 22 defined by an annular rib 23, a sloping annular portion 24 connecting the rib with an annular bulge portion or ridge 25, the inner edge of which terminates in an inwardly extending part 26 defining an external undercut groove. From the part 26, the disk extends substantially laterally in a skirt portion 27 terminating in a trim 28 which may either be severed from the disk or shaped to hold a rim engaging member, as the case may be. The disk is preformed to the shape described above and shown in Figures 4, 5 and 6, by any suitable mechanism, such as die mechanism.

While the disk may be used as it is and resilient retaining elements carried by a wheel may engage over the inwardly extending shoulder 26 to hold the disk in position upon a wheel, in some wheel constructions it is necessary to provide elongated retaining means for this purpose. The provision of elongated retaining elements may at times be inconvenient, and under some circumstances it is deemed more desirable to use relatively short retaining elements and provide the disk with a fastening flange.

To this end, a strip of stock may be preformed into a ring 29, the side walls of which are substantially paralled to the axis thereof. This ring at the upper end is provided with an arcuately inturned margin 30 and at the lower end with an inwardly rolled bead 31. While the side of the ring may be substantially straight, the curve adjacent the margin 30 and the similar curve adjacent the bead 31 are sufficient to cause an outward collapsing of the ring when axial pressure is applied. In the present instance, the ring 29 is of such size that the inwardly turned upper margin 30 rests against the inside face of the shoulder of least diameter forming the bulge or ridge 25.

The die mechanism used for uniting the ring 29 with the disk above described is substantially similar to that shown in Figures 1, 2 and 3. The lower die block, generally indicated by numeral 1a, includes a base 2a having an integral upstanding ring die 3a defining a central cavity 4a for the reception of a pad 5a urged outwardly by one or more springs 6a. The outward movement of the pad 6a is limited by the engagement of a pin 7a fixed in the wall of the ring die 3a with a notch or recess 8a in the pad.

The upper face of the pad 5a is shaped to intimately fit the undersurface of the disk to substantially the beginning of the annular ridge or bulge 25 and is preferably of such diameter that the ring 29 nicely fits over the side wall of the pad.

An upper die member 9a is provided having a projecting portion 10a of substantially the same over-all size as the ring die 3a. This portion 10a is concave to intimately fit over the outer face of the disk including the skirt 27. The other face of the ring die 3a is shaped complementally to the outer portion of the upper die, as indicated at 32, so as to intimately fit the underface of the skirt portion 27 in case the die members are moved sufficiently close together for such contact.

Certain differences occur in the die structures shown in Figures 4, 5 and 6 from those previously described in connection with Figures 1, 2 and 3. One difference resides in the fact that the upper die does not fill the external undercut groove defined by the part 26 of the disk. Another important difference is an outer outward curvature 33 on the wall of a socket 34 for receiving the lower portion of the ring 29. This curvature may be varied, depending upon the resultant formation desired in the ring, and in this instance is shown as shaped to guide the ring in a manner to intimately fit within the bulge or ridge portion 25 of the disk.

In forming the ring, the ring itself is first positioned over the side wall of the pad 5a, as seen in Figures 4 and 5, and then the disk is laid over the pad. When relative movement is provided between the die members, such, for example, as by a punch press, the initial position will be best seen in Figures 4 and 5. Upon further relative movement, the ring 29 will be collapsed to the position indicated in Figure 6. As in the previously described operation, the bead 31 of the ring functions substantially as a fulcrum around which the metal moves, this bead being confined in the socket 34 and by the pad 5a, so that the turned edge or bead will not be crimped upon itself. The metal will move outwardly over the arcuate portion 33, as indicated at 36, and effectively fill the interior of the bulge or ridge 25, as indicated at 35. It will be seen that the ring 29 forms an inwardly extending flange for engagement by retaining means carried by a vehicle wheel, and that the ring or flange is effectively locked in the ridge or bulge 25 of the disk behind and around the inwardly extending or indented portion 26 of the disk.

While herein the die members have been shown and described as the upper die member moving downwardly relatively to a fixed lower die member, it is obvious that both members may be moved or the lower moved relatively to the upper, as may be deemed most feasible. It is also obvious that the pad 5 of the lower die member may be pressed outwardly by other means than the springs 6 or 6a, such as pneumatic means which are known in the die-forming art.

From the foregoing, it is apparent that I have provided a novel method of and apparatus for die-forming skirt portions of a crown member by causing the skirt to collapse outwardly and assume a predetermined shape. I have also provided a method of and apparatus for joining or uniting a pair of parts by simply collapsing one of the parts outwardly to engage behind an undercut extension on the other part. Light or heavy metal may be used in practicing the present invention, and the practice of the method may be accomplished very economically.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. The method of forming a fastening flange and joining the same to a wheel covering member having an undercut indentation forming an inside shoulder, including placing a ring-like member in said covering member, and applying sufficient pressure to said ring-like member to collapse the same outwardly over and behind said shoulder.

2. The method of joining a pair of parts one of which has a crown-like portion with a tortuous interior, including preforming a ring-like part so the same will collapse outwardly when pressure is applied thereto in an axial direction, placing the preformed part in the crown portion of the other part, and applying sufficient pressure to collapse the preformed part to fit intimately the tortuous surface of the other part.

3. The method of joining a pair of parts one of which has a crown-like portion with a tortuous interior, including preforming a ring-like part so the same will collapse outwardly when pressure is applied thereto in an axial direction, placing the preformed part in the crown portion of the other part, and applying sufficient pressure to collapse the preformed part to fit intimately the tortuous surface of the other part while confining the collapsing of the preformed part to an intermediate region.

4. The method of joining a pair of parts one of which has a crown-like portion with a tortuous interior, including preforming a ring-like part so the same will collapse outwardly when pressure is applied thereto in an axial direction, placing the preformed part in the crown portion of the other part, applying sufficient pressure to collapse the preformed part to fit intimately the tortuous surface of the other part while confining the collapsing of the preformed part to an intermediate region, and maintaining both ends thereof of substantially their original overall dimensions.

5. The method of forming a wheel disk with an attaching flange, including preforming a disk with a crown portion of which the skirt has an undercut indentation, preforming a flange part to collapse outwardly upon the application of axial pressure thereto, placing the flange part in said crown portion, and applying pressure to said flange part to collapse the same while utilizing said crown portion to limit the collapsing and shape the collapsed part over and behind said indentation, and also maintaining the preformed shape of said wheel disk.

GEORGE ALBERT LYON.